US012609214B2

(12) United States Patent
Kondo et al.

(10) Patent No.: US 12,609,214 B2
(45) Date of Patent: Apr. 21, 2026

(54) CONDUCTIVE NONWOVEN FABRIC, AND METHOD FOR MANUFACTURING CONDUCTIVE NONWOVEN FABRIC

(71) Applicant: YAZAKI CORPORATION, Tokyo (JP)

(72) Inventors: Hiroki Kondo, Susono (JP); Satoka Ohnishi, Susono (JP); Satoko Hongo, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 312 days.

(21) Appl. No.: 18/317,062

(22) Filed: May 13, 2023

(65) Prior Publication Data

US 2023/0411037 A1 Dec. 21, 2023

(30) Foreign Application Priority Data

Jun. 17, 2022 (JP) .................................. 2022-098320

(51) Int. Cl.
| | |
|---|---|
| *H01B 5/00* | (2006.01) |
| *C23C 18/31* | (2006.01) |
| *D04H 1/72* | (2012.01) |
| *D04H 1/74* | (2006.01) |
| *D06M 11/83* | (2006.01) |
| *H01M 10/0525* | (2010.01) |
| *H01M 10/0562* | (2010.01) |

(52) U.S. Cl.
CPC .............. *H01B 5/00* (2013.01); *C23C 18/31* (2013.01); *D04H 1/72* (2013.01); *D04H 1/74* (2013.01); *D06M 11/83* (2013.01); *H01M 10/0525* (2013.01); *H01M 10/0562* (2013.01); *D10B 2401/063* (2013.01); *D10B 2401/16* (2013.01); *H01M 2300/0068* (2013.01)

(58) Field of Classification Search
CPC ...... D04H 1/72; D04H 1/4218; D04H 1/4242; D04H 1/4282; D04H 1/4291; D04H 1/4326; D04H 1/4342; D04H 1/435; D04H 1/70; D04H 1/74; H01B 5/00; C23C 18/30; C23C 18/31; D02G 3/40; D06M 11/83; D06M 23/105; D10B 2401/063; D10B 2401/16; H01M 10/0562; Y02E 60/10
USPC ............................................. 442/6
See application file for complete search history.

(56) References Cited

FOREIGN PATENT DOCUMENTS

| | | |
|---|---|---|
| JP | H10-22682 A | 1/1998 |
| JP | 2007-56287 A | 3/2007 |
| JP | 2019-75375 A | 5/2019 |

*Primary Examiner* — Camie S Thompson
(74) *Attorney, Agent, or Firm* — KENEALY VAIDYA LLP

(57) ABSTRACT

There are provided a conductive nonwoven fabric and a manufacturing method thereof, the conductive nonwoven fabric including: a plated felt portion including a felt portion formed of a plurality of first fibers that extend in irregular directions and that are stacked, and a metal plating applied to the first fibers of the felt portion; and at least one plated warp including a warp formed of a plurality of second fibers and the metal plating applied to the second fibers of the warp. The at least one plated warp is formed to extend in a specific direction with respect to the plated felt portion, and a density of the second fibers is higher than a density of the first fibers.

5 Claims, 7 Drawing Sheets

11M

12M

SPECIFIC
DIRECTION

F2

M

11

12

SPECIFIC
DIRECTION

F2

11M

F1

SURFACE OF FIBER ←--------→ INNER PORTION OF FIBER

12M

F2

SURFACE OF FIBER ←--------→ INNER PORTION OF FIBER

CONDUCTIVE NONWOVEN FABRIC, AND METHOD FOR MANUFACTURING CONDUCTIVE NONWOVEN FABRIC

CROSS-REFERENCE TO RELATED APPLICATIONS

This application is based on and claims priority under 35 USC 119 from Japanese Patent Application No. 2022-098320 filed on Jun. 17, 2022, the contents of which are incorporated herein by reference.

TECHNICAL FIELD

The present disclosure relates to a conductive nonwoven fabric and a method for manufacturing the conductive nonwoven fabric.

BACKGROUND ART

In the related art, a conductive nonwoven fabric having a nonwoven fabric and a metal layer formed on the nonwoven fabric has been proposed (for example, see JP2019-75375A).

Such a conductive nonwoven fabric is wound around an outer periphery of an electric wire, for example, and is used as a part of a shielded cable. In the shielded cable, while an electromagnetic shielding effect is exhibited by the metal layer of the conductive nonwoven fabric, the nonwoven fabric is relatively excellent in expansion and compression due to characteristics of the material and can follow the bending of the electric wire.

However, the conductive nonwoven fabric disclosed in JP2019-75375A is not good in plating deposition.

SUMMARY OF INVENTION

The present disclosure provides a conductive nonwoven fabric and a method for manufacturing the conductive nonwoven fabric capable of enhancing plating deposition.

According to an illustrative aspect of the present disclosure, a conductive nonwoven fabric includes: a plated felt portion including a felt portion formed of a plurality of first fibers that extend in irregular directions and that are stacked, and a metal plating applied to the first fibers of the felt portion; and at least one plated warp including a warp formed of a plurality of second fibers and the metal plating applied to the second fibers of the warp. The at least one plated warp is formed to extend in a specific direction with respect to the plated felt portion, and a density of the second fibers is higher than a density of the first fibers.

According to another illustrative aspect of the present disclosure, a method for manufacturing a conductive nonwoven fabric includes: preparing a nonwoven fabric including: a felt portion in which a plurality of first fibers extending in irregular directions are stacked; and at least one warp formed of a plurality of second fibers and extending in a specific direction with respect to the felt portion, a density of the second fibers being higher than a density of the first fibers; putting the nonwoven fabric into a treatment tank to immerse the nonwoven fabric in a supercritical fluid or a subcritical fluid containing an organometallic complex of a plating catalyst metal; and applying a metal plating to the nonwoven fabric that has immersed.

DESCRIPTION OF EMBODIMENTS

Hereinafter, the present disclosure will be described with reference to a preferred embodiment. It should be noted that the present disclosure is not limited to the embodiment described below, and modifications can be appropriately made without departing from the gist of the present disclosure. In addition, in the embodiment described below, although there are portions in which illustration and description of a part of the configurations are omitted, it is needless to say that a publicly known or well-known technique is appropriately applied to the details of the omitted technique within a range in which no contradiction with the contents described below occurs.

Figure 1:
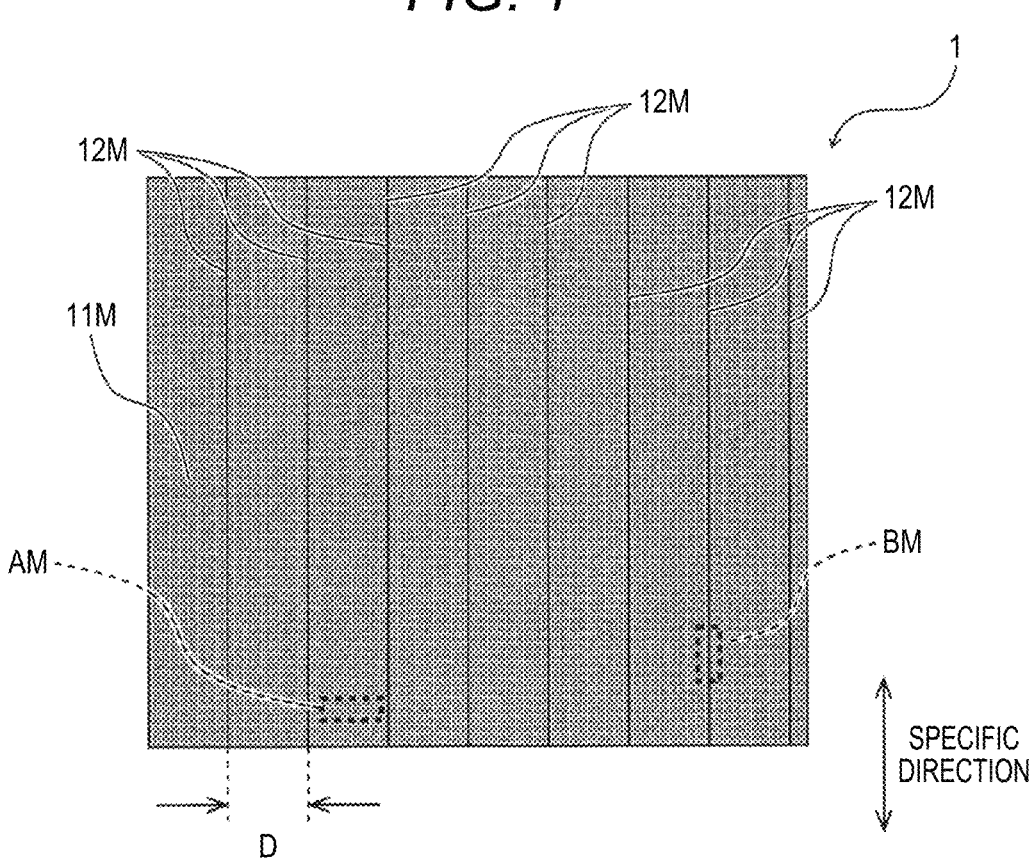
FIG. 1 is a plan view illustrating a conductive nonwoven fabric according to an embodiment of the present disclosure.
Figure 2:
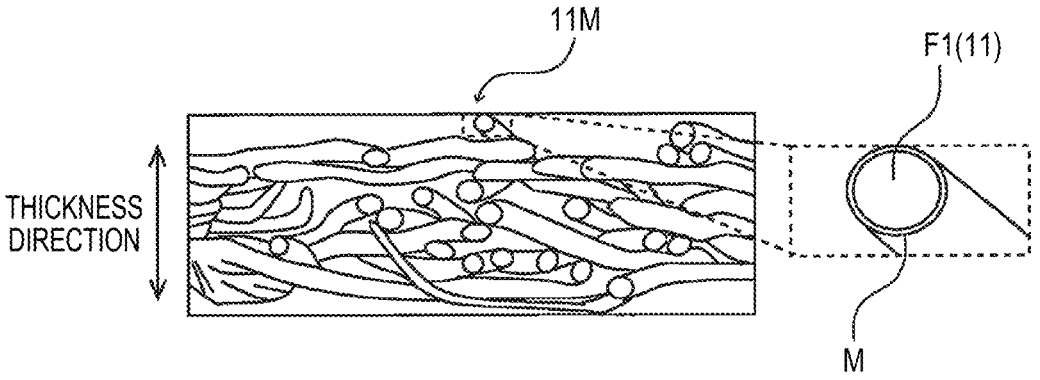
FIG. 2 is an enlarged cross-sectional view of a portion AM shown in FIG. 1.
Figure 3A:
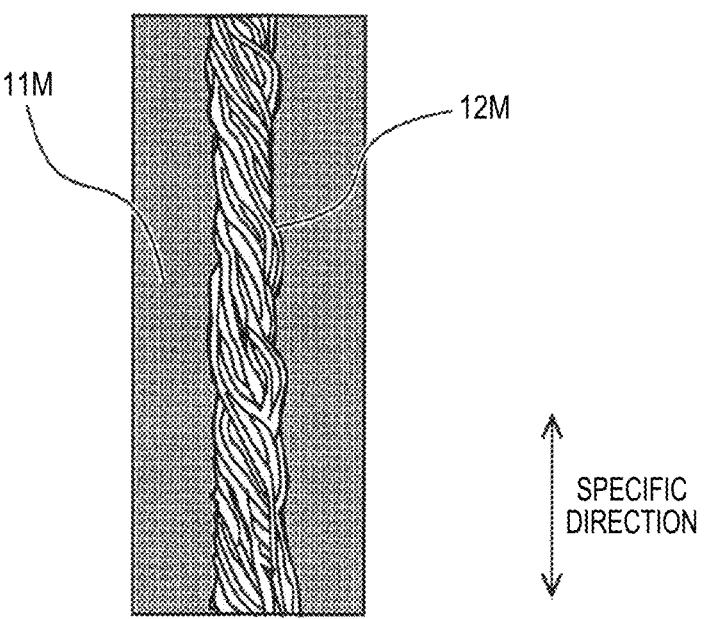
FIG. 3A is a partially enlarged view of the conductive nonwoven fabric shown in FIG. 1, and is specifically an enlarged view of a portion BM shown in FIG. 1.
Figure 3B:
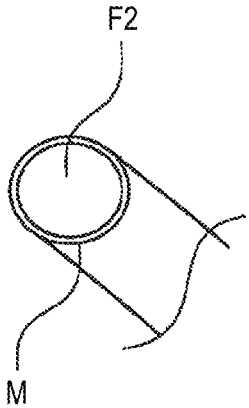
FIG. 3B is a partially enlarged view of the conductive nonwoven fabric shown in FIG. 1, and is specifically an enlarged view of a partial configuration in FIG. 3A.
Figure 4:
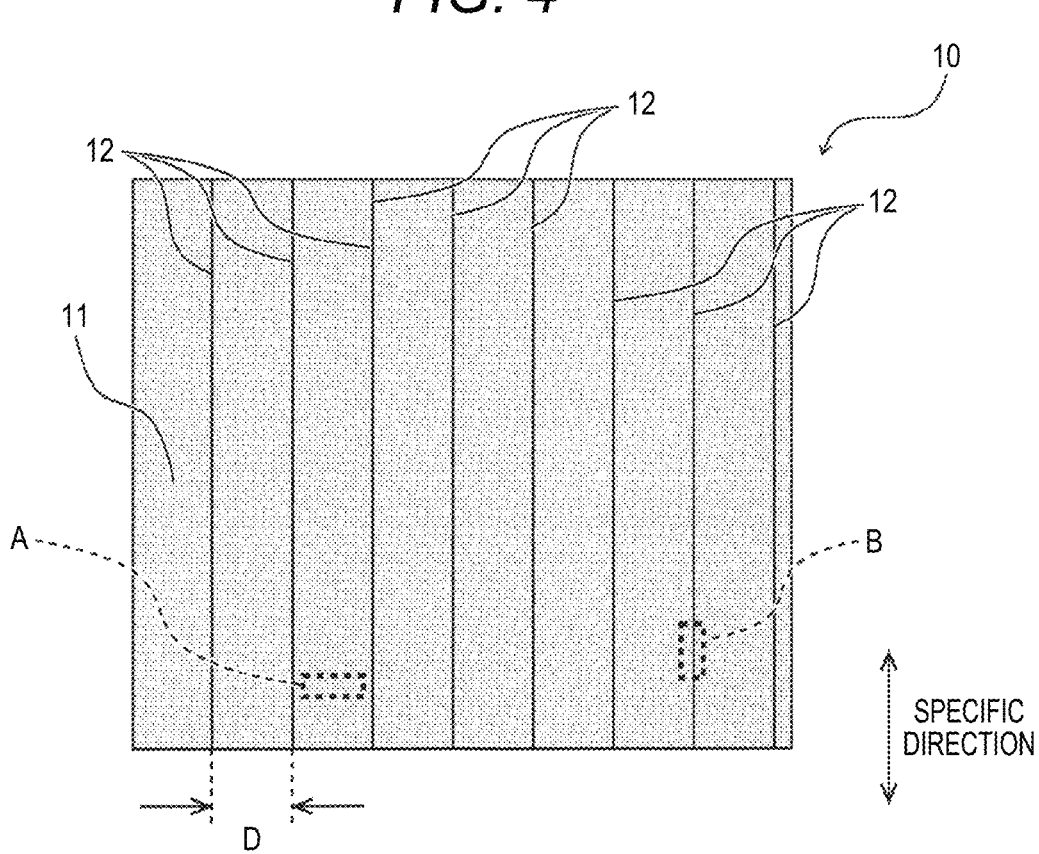
FIG. 4 is a plan view illustrating a nonwoven fabric forming the conductive nonwoven fabric according to the embodiment of the present disclosure.
Figure 5:
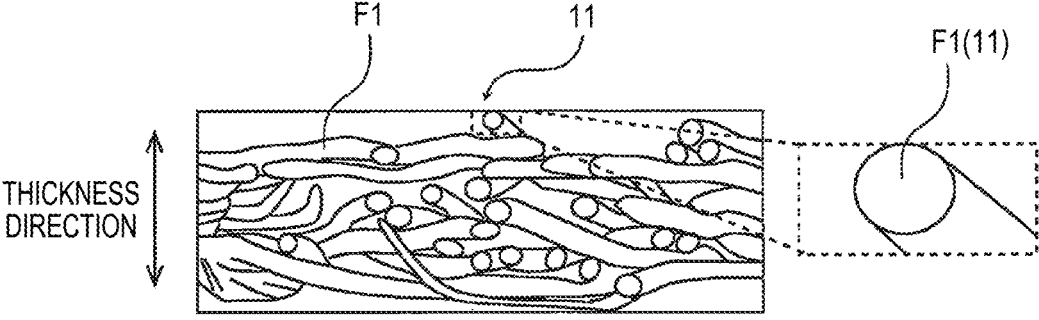
FIG. 5 is an enlarged cross-sectional view of a portion A shown in FIG. 4.
Figure 6A:
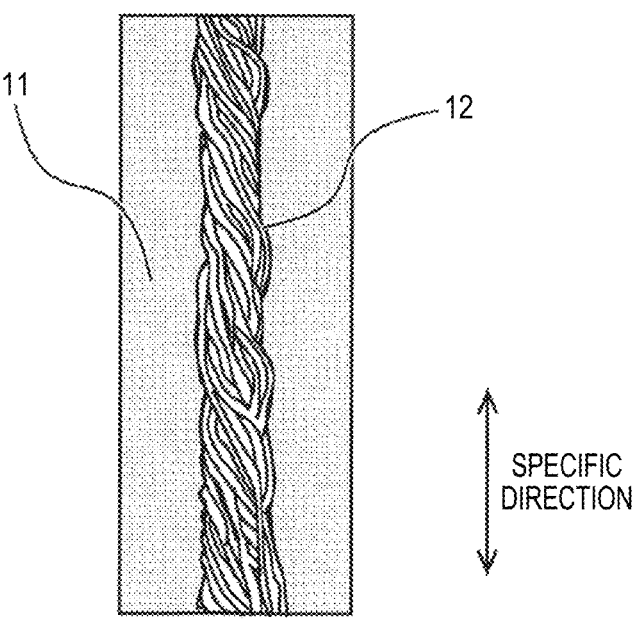
FIG. 6A is a partially enlarged view of the nonwoven fabric shown in FIG. 4, and is specifically an enlarged view of a portion B shown in FIG. 4.
Figure 6B:
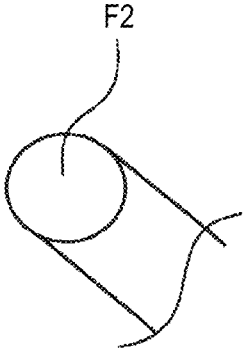
FIG. 6B is a partially enlarged view of the nonwoven fabric shown in FIG. 4, and is specifically an enlarged view of a partial configuration in FIG. 6A.

FIG. 1 is a plan view illustrating a conductive nonwoven fabric according to an embodiment of the present disclosure. FIG. 2 is an enlarged cross-sectional view of a portion AM shown in FIG. 1. FIG. 3A is a partially enlarged view of the conductive nonwoven fabric shown in FIG. 1, and is specifically an enlarged view of a portion BM shown in FIG. 1. FIG. 3B is a partially enlarged view of the conductive nonwoven fabric shown in FIG. 1, and is specifically an enlarged view of a partial configuration in FIG. 3A. FIG. 4 is a plan view illustrating a nonwoven fabric forming the conductive nonwoven fabric according to the embodiment of the present disclosure. FIG. 5 is an enlarged cross-sectional view of a portion A shown in FIG. 4. FIG. 6A is a partially enlarged view of the nonwoven fabric shown in FIG. 4, and is specifically an enlarged view of a portion B shown in FIG. 4. FIG. 6B is a partially enlarged view of the nonwoven fabric shown in FIG. 4, and is specifically an enlarged view of a partial configuration in FIG. 6A.

A conductive nonwoven fabric 1 shown in FIG. 1 is obtained by applying a metal plating M (see FIGS. 2, 3A and 3B) to a nonwoven fabric 10 shown in FIG. 4, and includes a plated felt portion 11M and a plurality of plated warps 12M.

The plated felt portion 11M includes a felt portion 11 (see FIG. 4) and the metal plating M (see FIG. 2). As shown in FIG. 5, the felt portion 11 is formed of a plurality of first fibers F1 that extend in irregular directions and are stacked in a thickness direction of the nonwoven fabric 10. The first fiber F1 is made of, for example, polyethylene terephthalate (PET), but is not limited thereto, and may be made of polypropylene, nylon, acrylic, glass fiber, carbon fiber, aramid fiber, polyarylate fiber, or the like.

By applying the metal plating M to the plurality of first fibers F1 forming the felt portion 11, the plated felt portion 11M shown in FIGS. 1 and 2 is formed.

The plurality of plated warps 12M are formed of a plurality of warps 12 (see FIGS. 4, 6A and 6B) and the metal plating M (see FIG. 3B). As illustrated in FIG. 6A, the warp 12 is formed to extend in a specific direction with respect to the felt portion 11. The plurality of warps 12 are formed such that an interval D (see FIG. 4) between the adjacent warps 12 is, for example, 2.5 mm or less.

As illustrated in FIGS. 6A and 6B, each warp 12 is formed of a plurality of second fibers F2. The second fibers F2 are made of the same material as the first fibers F1. Further, in the warp 12 illustrated in FIGS. 6A and 6B, a density of the second fibers F2 is higher than a density of the first fibers F1 illustrated in FIG. 5. That is, the second fibers F2 are denser than the first fibers F1.

The metal plating M is applied to the second fibers F2 forming the warps 12, thereby forming the plated warps 12M shown in FIGS. 1, 3A and 3B.

Here, since the conductive nonwoven fabric 1 according to the embodiment includes the plurality of plated warps 12M having a high fiber density, a tensile strength in the specific direction (the direction in which the plated warps 12M extend) is 0.5 MPa or more. Accordingly, a tensile strength equivalent to that of a normal adhesive tape is achieved.

The metal plating M is a conductive metal that covers the first and second fibers F1 and F2 forming the nonwoven fabric 10, and is formed on the first and second fibers F1 and F2 by, for example, electroless plating using a chemical reaction. The metal plating M is made of one or more metals selected from the group consisting of copper, silver, gold, nickel, chromium, tin, and zinc.

In addition, the conductive nonwoven fabric 1 has a plating catalyst metal (for example, palladium and nickel) in order to deposit the metal plating M by a chemical reaction. By immersing the nonwoven fabric 10 in a supercritical fluid or a subcritical fluid (for example, in supercritical carbon dioxide) containing an organometallic complex of the plating catalyst metal, the plating catalyst metal adheres to the nonwoven fabric 10.

Figure 7A:
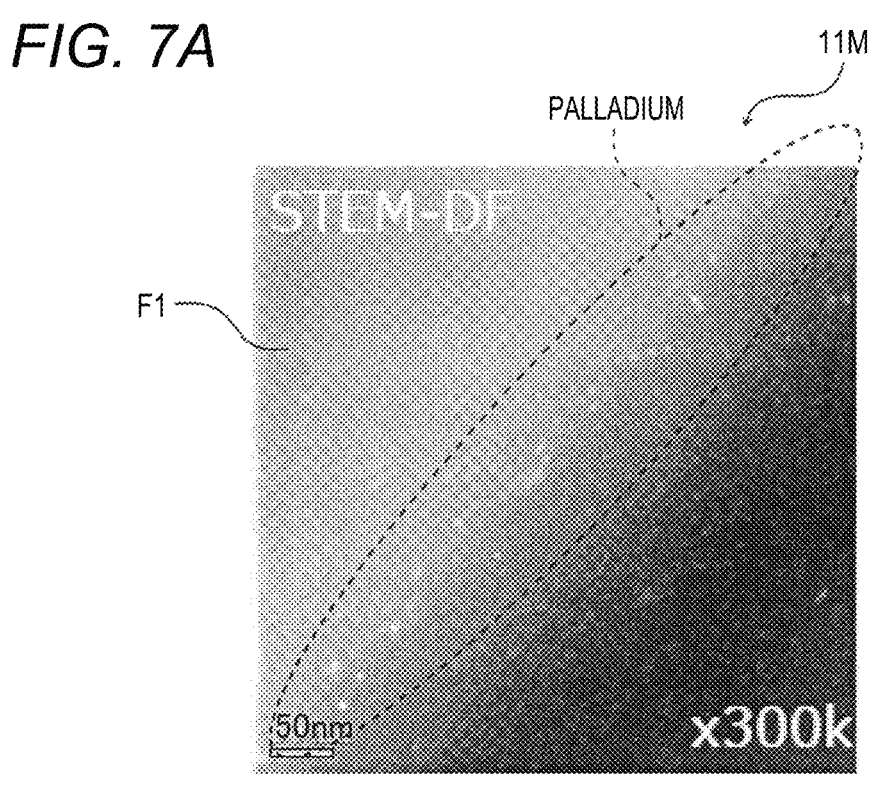
FIG. 7A is a photograph taken by a transmission electron microscope (TEM) showing the conductive nonwoven fabric according to the embodiment, specifically showing the vicinity of a surface of a first fiber of a plated felt portion.
Figure 7B:
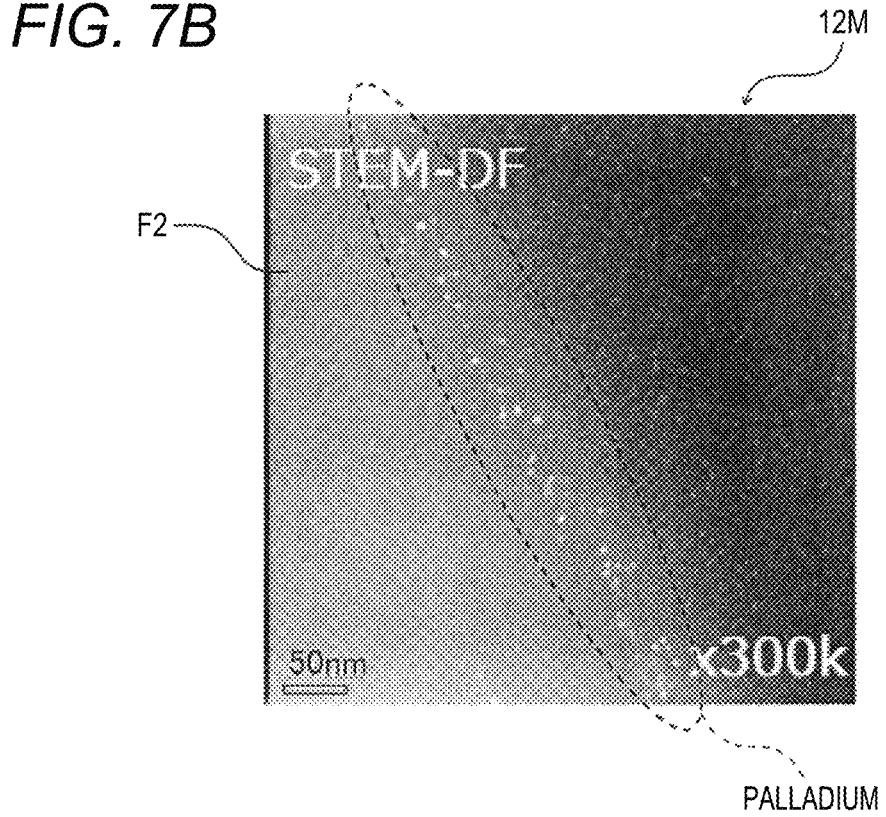
FIG. 7B is another photograph taken by the transmission electron microscope (TEM) showing the conductive nonwoven fabric according to the embodiment, specifically showing the vicinity of a surface of a second fiber of a plated warp.

FIG. 7A is a photograph taken by a transmission electron microscope (TEM) showing the conductive nonwoven fabric 1 according to the embodiment, specifically showing the vicinity of a surface of the first fiber F1 of the plated felt portion 11M. FIG. 7B is another photograph taken by the transmission electron microscope (TEM) showing the conductive nonwoven fabric 1 according to the embodiment, specifically showing the vicinity of a surface of the second fiber F2 of the plated warp 12M. In FIGS. 7A and 7B, white dots indicate palladium that is the plating catalyst metal.

As illustrated in FIG. 7A, palladium, which is the plating catalyst metal, is scattered in the vicinity of the surface of the first fiber F1 forming the plated felt portion 11M. Similarly, as illustrated in FIG. 7B, palladium, which is the plating catalyst metal, is scattered in the vicinity of the surface of the second fiber F2 forming the plated warp 12M.

Here, comparing the numbers of grains of the palladium, the plated warp 12M has the larger number of grains of the palladium than the plated felt portion 11M. This is because the density of the plurality of second fibers F2 forming the warp 12 is higher than the density of the plurality of first fibers F1 forming the felt portion 11. That is, when the nonwoven fabric 10 is immersed in the supercritical fluid or subcritical fluid containing the organometallic complex of the plating catalyst metal, since the fiber density of the second fibers F2 is high, it is hard for the fluid to pass between the second fibers F2. As a result, a large amount of the organometallic complex adheres to the second fibers F2.

Accordingly, in the conductive nonwoven fabric 1 according to the embodiment, the metal plating M is easily deposited on the warp 12 in an electroless plating process. Further, the formation of the metal plating M in a periphery of the warp 12 on the felt portion 11 can be promoted by centering on the metal plating M deposited on the warp 12.

In particular, in a case where the interval D between the warps 12 is 2.5 mm or less in the conductive nonwoven fabric 1 according to the embodiment, a space between the warps 12 (felt portion 11) is easily filled with the metal plating M. That is, in the conductive nonwoven fabric 1 according to the embodiment, since the metal plating M is easily deposited on the warp 12 and the periphery thereof, the metal plating M can be appropriately formed even on the felt portion 11, on which the metal plating M is hard to deposit, by narrowing the interval D between the warps 12 to a certain extent.

Figure 8A:
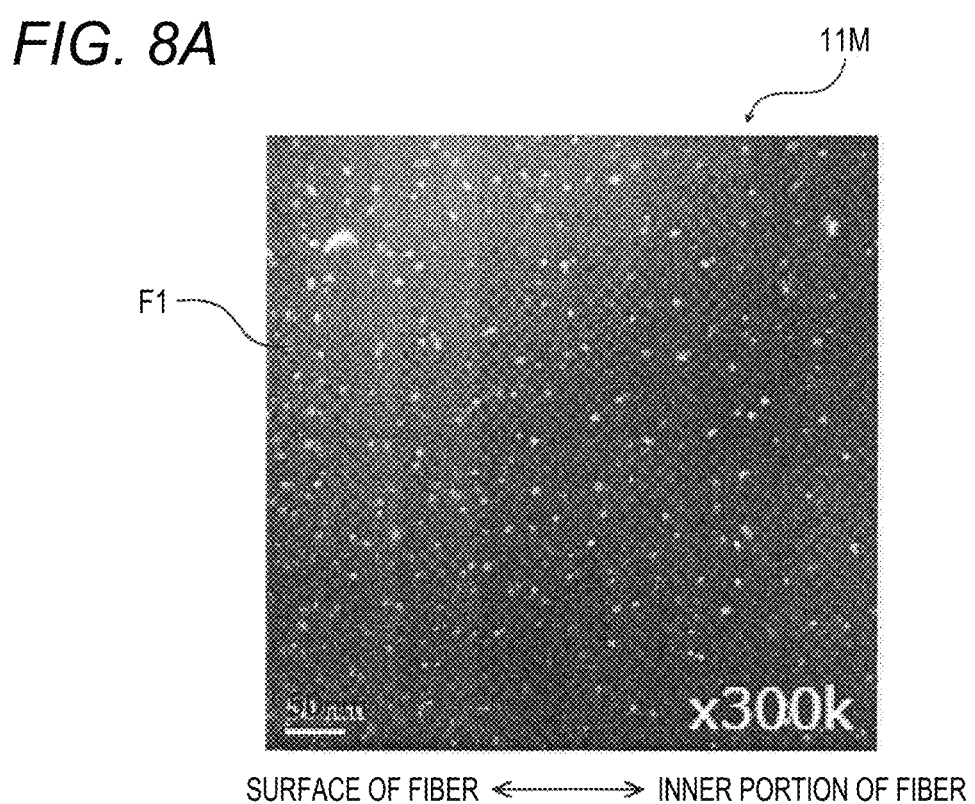
FIG. 8A is a photograph taken by a transmission electron microscope (TEM) showing the conductive nonwoven fabric according to the embodiment, specifically showing an inner portion of the first fiber of the plated felt portion.
Figure 8B:
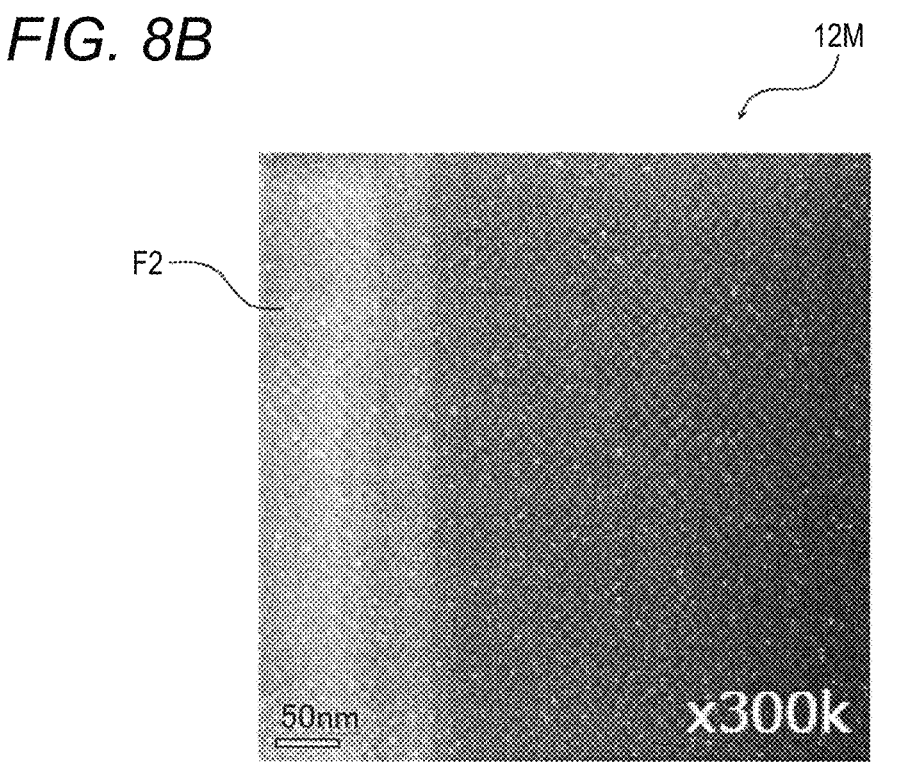
FIG. 8B is another photograph taken by the transmission electron microscope (TEM) showing the conductive nonwoven fabric according to the embodiment, specifically showing an inner portion of the second fiber of the plated warp.

FIG. 8A is a photograph taken by the transmission electron microscope (TEM) showing the conductive nonwoven fabric 1 according to the embodiment, specifically showing an inner portion of the first fiber F1 of the plated felt portion 11M. FIG. 8B is another photograph taken by the transmission electron microscope (TEM) showing the conductive nonwoven fabric 1 according to the embodiment, specifically showing an inner portion of the second fiber F2 of the plated warp 12M. Also, in FIGS. 8A and 8B, white dots indicate palladium that is the plating catalyst metal.

As illustrated in FIG. 8A, a large number of grains of palladium, which is the plating catalyst metal, are scattered in the inner portion of the first fiber F1 forming the plated felt portion 11M, and a grain diameter thereof is large. In contrast, as illustrated in FIG. 8B, a large number of grains of palladium, which is the plating catalyst metal, are scattered in the inner portion of the second fiber F2 forming the plated warp 12M, and a grain diameter thereof is smaller than that of the first fiber F1.

Here, the smaller the grain diameter of the plating catalyst metal is, the more easily the metal plating M is deposited. Therefore, in the conductive nonwoven fabric 1 according to the embodiment, a degree of crystallinity of the second fiber F2 is set to be higher than a degree of crystallinity of the first fiber F1, so that the metal plating M can be easily deposited on the warp 12.

Figure 9:
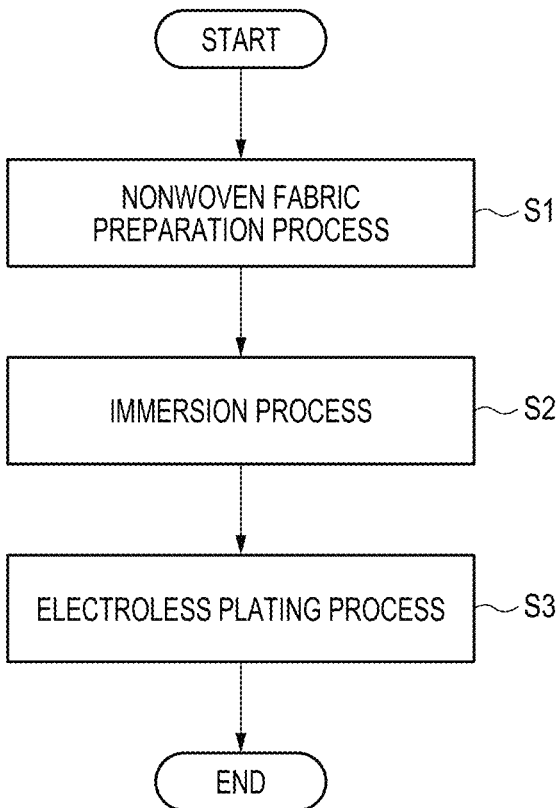
FIG. 9 is a flowchart illustrating a method for manufacturing the conductive nonwoven fabric according to the embodiment.

FIG. 9 is a flowchart illustrating a method for manufacturing the conductive nonwoven fabric 1 according to the embodiment. First, as illustrated in FIG. 9, a nonwoven fabric preparation process (S1) is performed. In the nonwoven fabric preparation process, as illustrated in FIG. 4, the nonwoven fabric 10 in which a plurality of warps 12 are formed on the felt portion 11 is prepared. In the nonwoven fabric 10, as described above, the fiber density of the warp 12 is higher than the fiber density of the felt portion 11, and the second fibers F2 forming the warp 12 have a higher degree of crystallinity than the first fiber F1 forming the felt portion 11.

Next, an immersion process is performed (S2). In the immersion process, the nonwoven fabric 10 is put into a treatment tank (not shown), and the nonwoven fabric 10 is immersed in a supercritical fluid or a subcritical fluid (for example, in supercritical carbon dioxide) containing an organometallic complex of a plating catalyst metal. Through this process, the organometallic complex of the plating catalyst metal adheres to the nonwoven fabric 10. In particular, in the nonwoven fabric 10 prepared in the nonwoven fabric preparation process of step S1, the warp 12 has a high fiber density, and thus a large amount of the organometallic complex of the plating catalyst metal adheres to the warp 12. In addition, since the degree of crystallinity of the second fiber F2 forming the warp 12 is higher than the degree of crystallinity of the first fiber F1 forming the felt portion 11, only the organometallic complex of the plating catalyst metal having a smaller grain diameter enters the inner portion of the second fiber F2.

Thereafter, an electroless plating process is performed (S3). In the electroless plating process, the nonwoven fabric 10 subjected to a reduction process is supplied to an electroless plating tank, and the metal plating M is deposited in a periphery of the plating catalyst metal by utilizing a chemical reaction. At this time, the warp 12 of the nonwoven fabric 10 has a large amount of the plating catalyst metal, and the plating catalyst metal having a smaller grain diameter enters the inner portion of the warp 12. Accordingly, the metal plating M is favorably deposited on the warp 12. In addition, the metal plating M is also favorably deposited on the felt portion 11, centering on the metal plating M deposited on the warp 12. Thus, the conductive nonwoven fabric 1 according to the embodiment is obtained.

In this way, according to the conductive nonwoven fabric 1 and the method for manufacturing the conductive nonwoven fabric 1 according to the embodiment, since the density of the second fibers F2 forming the warp 12 is higher than that of the first fibers F1 forming the felt portion 11, it is possible to cause a large amount of the organometallic complex to adhere to the second fibers F2 by using the fiber density. Therefore, the metal plating M can be favorably deposited on the warp 12 at least, and the formation of the metal plating M in the periphery of the warp 12 can be promoted by centering on the metal plating M deposited on the warp 12. Accordingly, plating deposition can be enhanced.

In addition, since the tensile strength in the specific direction is 0.5 MPa or more, a strength equivalent to that of a general vinyl chloride tape can be secured.

Further, since the interval between adjacent warps 12 of the plurality of warps 12 is 2.5 mm or less, it is possible to easily form the metal plating M between the warps 12, centering on the metal plating M formed on the warps 12.

In addition, since the plated warp 12M is formed of the second fibers F2 having a higher degree of crystallinity than the first fibers F1 forming the plated felt portion 11M, for example, when the nonwoven fabric 10 is immersed in a supercritical fluid or a subcritical fluid containing an organometallic complex, only the organometallic complex having a small grain diameter enters the inner portion of the second fiber F2, which can contribute to improvement of plating deposition.

Although the present disclosure has been described above based on the embodiment, the present disclosure is not limited to the above embodiment, and modifications may be made without departing from the gist of the present disclosure and publicly known or well-known techniques may be appropriately combined.

For example, in the above embodiment, the plated warp 12M (warp 12) extends from one end to the other end in the specific direction without interruption in the middle of the conductive nonwoven fabric 1 (nonwoven fabric 10), and the present disclosure is not particularly limited thereto. Alternatively, the plated warp 12M may be interrupted in the middle. Further, in the above embodiment, the conductive nonwoven fabric 1 (nonwoven fabric 10) includes a plurality of the plated warps 12M (warps 12), and the present disclosure is not particularly limited thereto. Alternatively, the conductive nonwoven fabric 1 may include only one warp 12M.

In the above embodiment, the first fiber F1 and the second fiber F2 are made of the same material, and the present disclosure is not limited thereto. Alternatively, the first fiber F1 and the second fiber F2 may be made of different materials. Further, in the conductive nonwoven fabric 1 according to the embodiment, the degree of crystallinity of the second fiber F2 is higher than the degree of crystallinity of the first fiber F1, and the present disclosure is not particularly limited thereto. As long as there is no problem in deposition of the metal plating M, the degrees of crystallinity of the fibers F1 and F2 may be equal to each other, or the degree of crystallinity of the second fiber F2 may be lower than that of the first fiber F1.

According to a first aspect of the present disclosure, a conductive nonwoven fabric (1) includes: a plated felt portion (11M) including a felt portion (11) formed of a plurality of first fibers (F1) that extend in irregular directions and that are stacked, and a metal plating (M) applied to the first fibers (F1) of the felt portion (11); and at least one plated warp (12M) including a warp (12) formed of a plurality of second fibers (F2) and the metal plating (M) applied to the second fibers (F2) of the warp (12). The at least one plated warp (12M) is formed to extend in a specific direction with respect to the plated felt portion (11M), and a density of the second fibers (F2) is higher than a density of the first fibers (F1).

According to a second aspect of the present disclosure, a tensile strength of the conductive nonwoven fabric (1) in the specific direction may be 0.5 MPa or more.

According to a third aspect of the present disclosure, the warp (12) may include a plurality of warp (12), and an interval (D) between adjacent warps of the plurality of warps (12) may be 2.5 mm or less.

According to a fourth aspect of the present disclosure, the second fibers (F2) of the warp (12) may have a higher degree of crystallinity than the first fibers (F1) of the felt portion (11).

According to a fifth aspect of the present disclosure, a method for manufacturing a conductive nonwoven fabric (1) includes: preparing a nonwoven fabric (10) including: a felt portion (11) in which a plurality of first fibers (F1) extending in irregular directions are stacked; and at least one warp (12) formed of a plurality of second fibers (F2) and extending in a specific direction with respect to the felt portion (11), a density of the second fibers (F2) being higher than a density of the first fibers (F1); putting the nonwoven fabric (10) into a treatment tank to immerse the nonwoven fabric (10) in a supercritical fluid or a subcritical fluid containing an organometallic complex of a plating catalyst metal; and applying a metal plating (M) to the nonwoven fabric (10) that has immersed.

According to the present disclosure, it is possible to provide a conductive nonwoven fabric and a method for manufacturing the conductive nonwoven fabric capable of enhancing plating deposition.

What is claimed is:

1. A conductive nonwoven fabric comprising:
a plated felt portion including a felt portion formed of a plurality of first fibers that extend in irregular directions and that are stacked, and a metal plating applied to the first fibers of the felt portion; and
at least one plated warp including a warp formed of a plurality of second fibers and the metal plating applied to the second fibers of the warp, wherein
the at least one plated warp is formed to extend in a specific direction with respect to the plated felt portion, and
a density of the second fibers is higher than a density of the first fibers.

2. The conductive nonwoven fabric according to claim 1, wherein
a tensile strength of the conductive nonwoven fabric in the specific direction is 0.5 MPa or more.

3. The conductive nonwoven fabric according to claim 1, wherein
the warp includes a plurality of warp, and
an interval between adjacent warps of the plurality of warps is 2.5 mm or less.

4. The conductive nonwoven fabric according to claim 1, wherein
the second fibers of the warp have a higher degree of crystallinity than the first fibers of the felt portion.

5. A method for manufacturing a conductive nonwoven fabric, the method comprising:
preparing a nonwoven fabric including: a felt portion in which a plurality of first fibers extending in irregular directions are stacked; and at least one warp formed of a plurality of second fibers and extending in a specific direction with respect to the felt portion, a density of the second fibers being higher than a density of the first fibers;
putting the nonwoven fabric into a treatment tank to immerse the nonwoven fabric in a supercritical fluid or a subcritical fluid containing an organometallic complex of a plating catalyst metal; and
applying a metal plating to the nonwoven fabric that has immersed.

* * * * *